United States Patent
Ferber

(10) Patent No.: US 7,428,039 B2
(45) Date of Patent: Sep. 23, 2008

(54) METHOD AND APPARATUS FOR PROVIDING UNIFORM ILLUMINATION OF A MASK IN LASER PROJECTION SYSTEMS

(75) Inventor: Joerg Ferber, Angerstein (DE)

(73) Assignee: Coherent, Inc., Santa Clara, CA (US)

( * ) Notice: Subject to any disclaimer, the term of this patent is extended or adjusted under 35 U.S.C. 154(b) by 289 days.

(21) Appl. No.: 11/281,847

(22) Filed: Nov. 17, 2005

(65) Prior Publication Data

US 2007/0109519 A1    May 17, 2007

(51) Int. Cl.
   *G03B 27/54*   (2006.01)
   *G03B 27/42*   (2006.01)
(52) U.S. Cl. .......................................... 355/67; 355/53

(58) Field of Classification Search ................... 355/67, 355/69, 53, 55; 235/454; 250/492.24; 359/15; 8/67, 69, 53, 55; 362/268
See application file for complete search history.

(56) References Cited

U.S. PATENT DOCUMENTS

| 6,494,371 | B1 | 12/2002 | Rekow et al. ............... 235/454 |
| 2001/0028448 | A1* | 10/2001 | Mori ........................... 355/55 |
| 2003/0086265 | A1* | 5/2003 | Ilsaka et al. ................. 362/268 |

* cited by examiner

*Primary Examiner*—Peter B Kim
(74) *Attorney, Agent, or Firm*—Stallman & Pollock LLP

(57) ABSTRACT

An optical system for projecting a laser-beam on a mask to illuminate the mask includes a beam homogenizing arrangement including spaced arrays of microlenses. The beam homogenizing arrangement redistributes light in the laser beam such that the intensity of light in the laser-beam on the mask is nearly uniform along a transverse axis of the laser-beam. A stop extending partially into the laser-beam between the microlens arrays provides a more uniform light-intensity on the mask along the transverse axis than can be achieved by the microlens arrays alone.

16 Claims, 7 Drawing Sheets

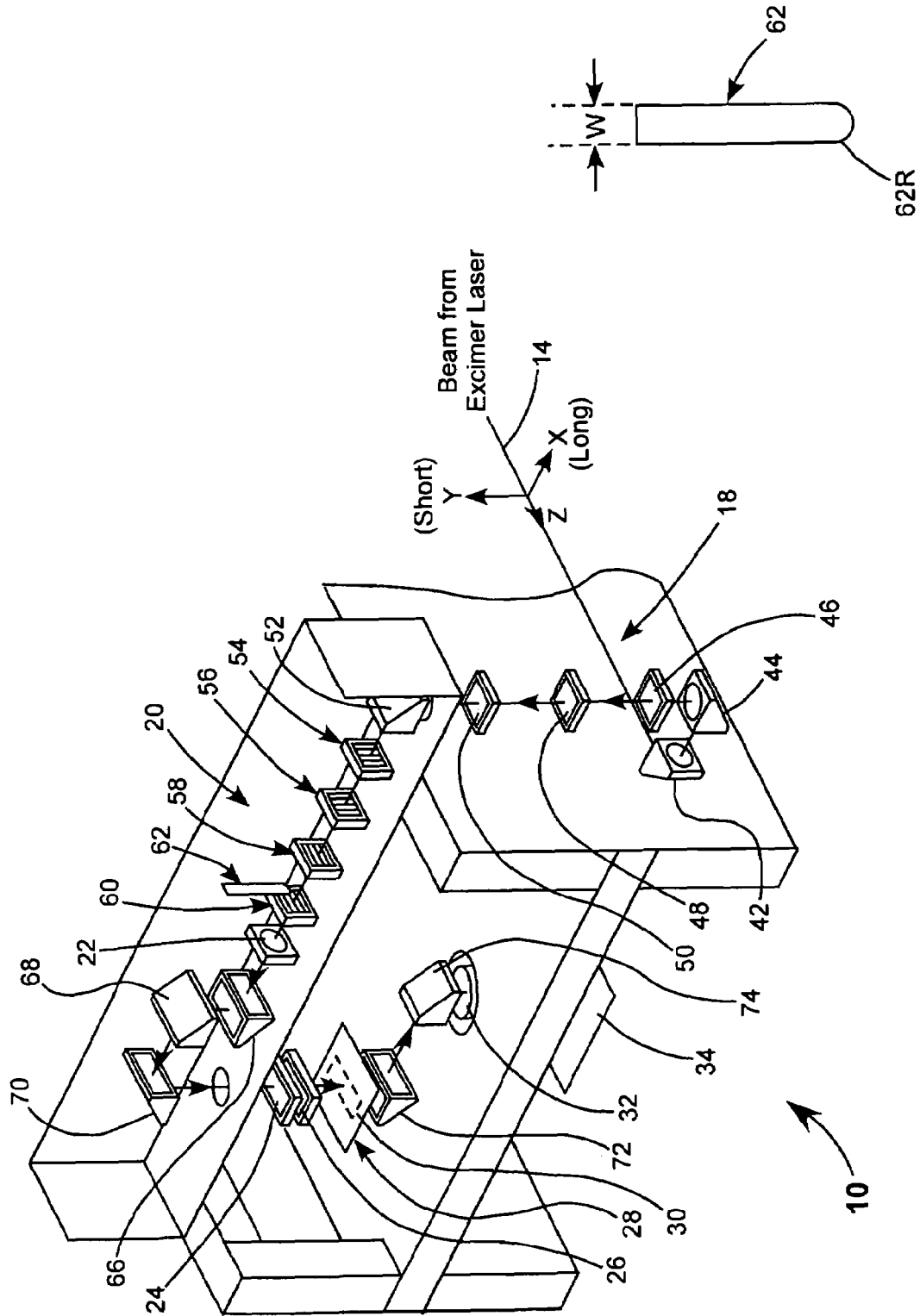

METHOD AND APPARATUS FOR PROVIDING UNIFORM ILLUMINATION OF A MASK IN LASER PROJECTION SYSTEMS

TECHNICAL FIELD OF THE INVENTION

The present invention relates in general to optical systems for projecting an image of a mask on a substrate in laser material processing applications. The invention relates in particular to methods and apparatus for uniformly illuminating the mask.

DISCUSSION OF BACKGROUND ART

In laser material processing applications, such as crystallization, annealing, or nozzle drilling systems, a certain spatial distribution of laser radiation on a substrate or material being processed is often required. One well-known method of providing the spatial distribution includes illuminating an area of a mask which has a pattern of apertures therein with the laser radiation, and projecting an image of the aperture patterns on the substrate. Certain applications, particularly laser crystallization, demand a very high degree of uniformity of illumination of the mask.

Several arrangements have been used or proposed for providing such uniform illumination on a mask. The complexity of the arrangements is usually inversely dependent on the quality of the laser radiation delivered from the laser providing that radiation. More complex designs are required for lasers that provide beams that are multimode in at least one axis, are not symmetrical in cross-section, or have an intensity distribution that is not Gaussian in at least one axis. The effectiveness of any such arrangement, of course, can be compromised if the distribution of radiation in the beam varies with time. This can occur in gas-discharge lasers, particularly in high-pressure, pulsed gas-discharge lasers such as excimer lasers. Such variations can be random variations on a spatial scale that is a fraction of the overall dimensions of the laser-beam, and can appear as spatial modulations in a more general distribution of the radiation on the substrate. The variations can also be longer term, temporal variations that effect primarily the general distribution of the radiation on the substrate. Optical arrangements for re-distribution of radiation in a laser-beam have relied on using devices such as anamorphic optical systems, diffractive optical elements, and "beam homogenizing" devices such as microlens arrays, diffusers, and light-pipes.

In prior-art excimer-laser projection systems it has been possible to provide a general or intensity variation as low as between about 1% about 2% of nominal over the illuminated area using a combination of anamorphic optical elements and anamorphic microlens arrays to shape and homogenize radiation in the laser-beam. Radiation distribution at this level of uniformity often rises from a low level at edges of the illuminated area to a maximum at the center of the illuminated area. This is sometimes referred to by practitioners of the art as a "center-up" distribution. In certain demanding applications, laser crystallization in particular, an absolute intensity variation of less than 1.5% is preferred. When random and temporal variations of energy distribution are combined with the 1% and 2% general energy distribution variation of 1.5% or less is difficult to achieve consistently. Accordingly, there is a need to reduce the variation in general distribution of energy below the level that has been achieved to date in prior-art laser projection systems.

SUMMARY OF THE INVENTION

The present invention is directed to a method and apparatus for illuminating a mask with a beam of radiation from a laser. In one aspect, the present invention comprises directing the laser beam through a plurality of optical elements located on a longitudinal axis. The optical elements are arranged to project the beam onto the mask to illuminate the mask. The configuration and arrangement of the optical elements is selected such that the intensity of radiation in the laser-radiation beam on the mask is nearly uniform in a transverse axis of the beam. Uniformity of radiation in the laser-radiation beam on the mask in the transverse axis is optimized by partially blocking at least one edge of the laser-radiation beam at a location between selected ones of the optical elements.

In another aspect of the invention, the edge blocking of the laser-radiation beam is accomplished by a least one stop extending partially into the laser-radiation beam at the selected location. In one preferred embodiment of the invention, the stop has a width less than the transverse-axis width of the laser-radiation beam and the stop has a rounded tip at an end thereof extending into the laser-radiation beam. In one example, the nearly uniform distribution provided by the optical elements is the above discussed "center-up" distribution having a single, central, peak value and a 2σ (two standard deviations) uniformity of about 2.08%. In one uniformity-optimization provided by the edge-blocking with the stop, the optimized distribution has two peak values having a centrally located trough value therebetween, and has a 2σ uniformity of about 1.36%.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1 is a three-dimensional view schematically illustrating an excimer laser projection system in accordance with the present invention including an excimer laser delivering a laser-beam having a long-axis and a short-axis perpendicular to each other, an anamorphic telescope arranged to expand and shape the laser-beam, a beam homogenizer including two pairs of cylindrical-microlens arrays for spatially redistributing energy in the expanded, shaped laser-beam, a narrow stop arranged to partially block the expanded, shaped and partially homogenized beam between two of the microlens arrays, and condensing and field lenses for focusing the shaped, homogenized beam onto a mask.

FIG. 2 schematically illustrates one preferred example of the beam-stop of FIG. 1 having a rounded tip for insertion into the beam.

DETAILED DESCRIPTION OF THE INVENTION

Figure 3:
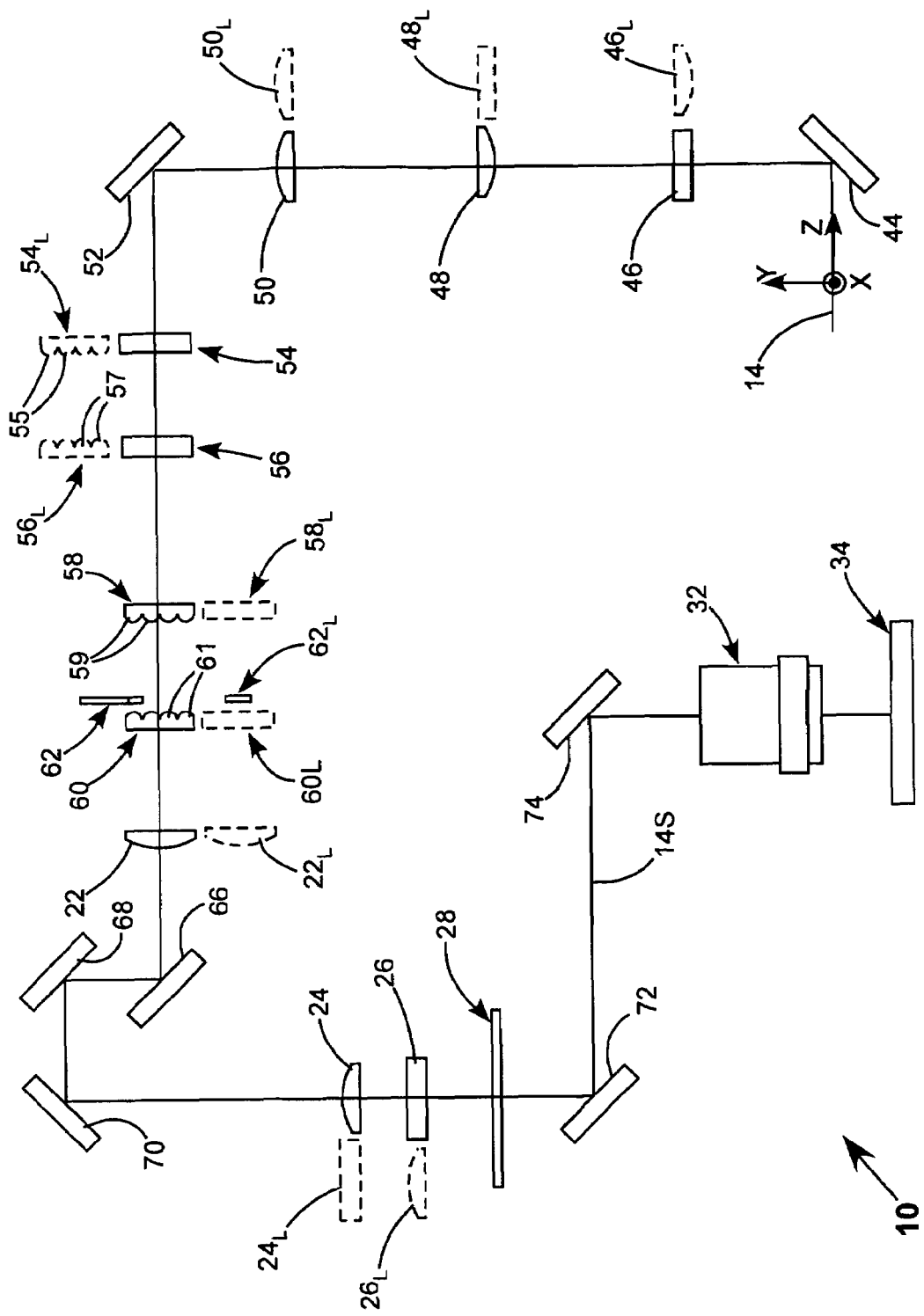
FIG. 3 is an elevation view of the projection system of FIG. 1 seen in the short-axis of the laser-beam, and schematically illustrating a preferred positioning of the beam-stop between arrays in one pair of the microlens arrays of FIG. 1 and illustrating further detail of the condensing optics and mask.

Referring now to the drawings, wherein like components are designated by like reference numerals, FIG. 1, FIGS. 2A and 2B, FIG. 3, and FIGS. 4A and 4B schematically illustrate an embodiment 10 of an optical system in accordance with the present invention for projecting an image of a mask on a substrate. An excimer laser (not shown) delivers a beam 14 propagating along a system axis (the Z-axis in an X, Y, Z, Cartesian axis system). In an optical system such as system 10 it is usual to provide a variable attenuator (also not shown) to allow power in the beam to be varied according to the application. A description of such an attenuator is not necessary for understanding principles of the present invention.

Beam 14, on leaving the excimer laser, has an elongated cross-section. In one example of an excimer laser the beam leaving the laser has a width of about 12.0 mm and a length of about 35.0 mm. The length and width of the beam define the X and Y-axes, which are often referred to by practitioners of the excimer laser art as the long-axis and short-axis respectively.

Figure 4A:
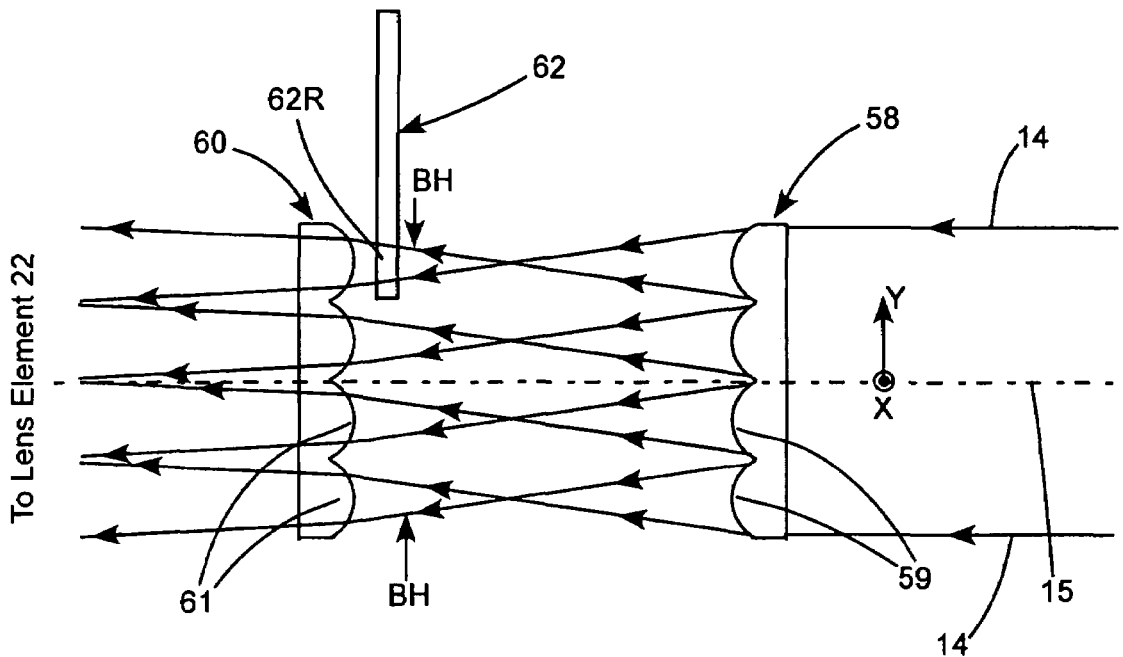
FIG. 4A is an elevation view seen in the short-axis of the laser-beam, and schematically illustrating details of the beam-stop and the beam between the microlens arrays of FIG. 3.
Figure 4B:
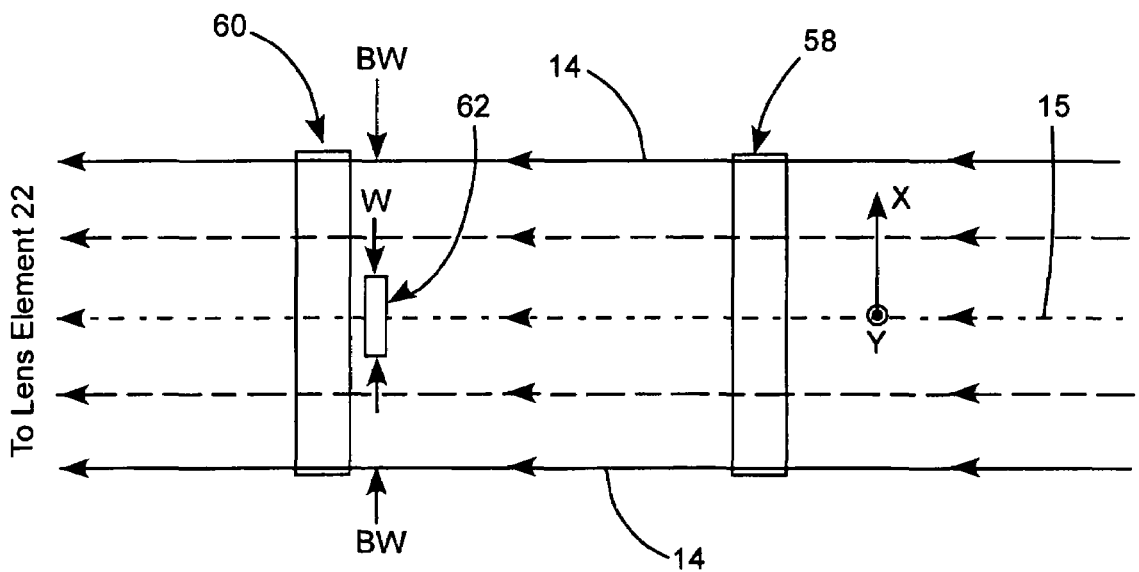
FIG. 4B is a plan view from above seen in the long-axis of the laser-beam, and schematically illustrating further details of the beam stop and the beam between the microlens arrays of FIG. 4A.

Turning mirrors 42 and 44 direct the beam (after having traversed any attenuator) into an anamorphic telescope 18, here, including cylindrical lenses 46 and 48 and a spherical lens 50. The purpose of telescope 18 is to adapt the beam to the aperture of a beam-homogenizer formed by microlens arrays 54, 56, 58 and 60. Details of the telescope and other important system groups are depicted in FIGS. 1 and 3. FIG. 1 is a three dimensional view. FIG. 3 is a view in the plane of the short-axis of optical system 10 showing further detail of components of system 10. In FIG. 3, the long-axis appearance of certain components is schematically depicted in dashed lines and designated by reference numerals having a subscript L. In FIGS. 1 and 3, only the general direction of propagation of beam 14 is depicted, as a single line collinear with the longitudinal optical axis (the Z-axis) of system 10. In FIGS. 4A and 4B, multiple lines 14 depict bounds of the beam.

A turning mirror 52 directs the collimated beam into the beam homogenizing arrangement 20 comprising microlens arrays 54, 56, 58, and 60. Microlens array 54 includes a plurality of elongated plano-convex cylindrical microlenses 55 and microlens array 56 includes a plurality of elongated plano-convex microlenses 57. Microlens arrays 54 and 56 can be described as the "long-axis beam-homogenizer". Preferably there are twelve microlenses in each array, however, in FIG. 3 only four microlenses are depicted in each array for convenience of illustration. The microlenses in each array are aligned parallel to the short-axis and have positive optical power in the long-axis and zero optical power in the short-axis. The microlenses in one array are arranged as a long-axis optical relay with corresponding microlenses in the other array. Beam 14 next traverses microlens arrays 58 and 60, forming what can be described as the "short-axis beam-homogenizer". Microlens array 58 includes a plurality of plano-convex cylindrical microlenses 59 and microlens array 60 includes a plurality of planoconvex microlenses 61. Again, only four microlenses are depicted in each array for convenience of illustration. The microlenses in each array are aligned parallel to the long-axis and have positive optical power in the short-axis and zero optical power in the long-axis. The microlenses in one array are arranged as a short-axis optical relay with corresponding microlenses in the other array.

Located between microlenses 58 and 60 is an elongated partial-shutter or beam-stop 62, details of a preferred form of which are schematically depicted in FIG. 2. Interaction of the stop with the beam, and a preferred location of the stop with respect to the beam are schematically depicted in FIGS. 4A and 4B. The purpose of stop 62 is to prevent the above discussed "center-up" intensity distribution in an image projected on the substrate by the optical system. Stop 62 preferably has a width W (see FIG. 2) that is between about 5% and about 50% of the long-axis width BW of beam 14 between microlenses 58 and 60 (see FIG. 4B). The stop preferably has a rounded tip 62A having a radius about equal to W/2. The stop is preferably positioned over the longitudinal axis 15 of the optical system (see again FIG. 4B). The stop is preferably positioned closer to microlens array 60 (the exit microlens array of the short-axis beam-homogenizer) than to microlens 58 (the entrance microlens array of the short-axis beam-homogenizer), and most preferably positioned immediately adjacent the exit microlens array. It is also possible that stop 62 be located adjacent microlens array 60, between lens 22 and microlens array 60. Stop 62 preferably extends into the beam in the short-axis direction for a distance between about 3% and about 35% of the short axis beam height (see FIG. 4A). The stop must not, however, extend across the system optical axis. The optimum extension-distance may vary from system to system but can be quickly determined experimentally for any stop dimension in the preferred range.

After traversing the short-axis beam-homogenizer, the collimated beam 14 traverses a spherical lens 22 having positive power and is directed by turning mirrors 66, 68, and 70 to a plano-convex cylindrical lens 24 having positive power in the short-axis and zero-optical power in the long-axis. After traversing lens 24 the beam traverses another plano-convex cylindrical lens 26. Lens 26 has positive power in the long-axis and zero-optical power in the short-axis. An effect of lenses 22, 24, and 26 is project beam 14 on a mask 28 with an elongated cross-section (indicated in FIG. 1 by dashed line 30) having a length between about 25 mm and 125.0 mm and a width 8 between about 3 mm and 25 mm. That portion 14S (see FIG. 3) of beam 14 passing through patterns of apertures (not shown) is directed by turning mirrors 72 and 74 to an imaging lens 32. Imaging lens 32 focuses light 14S as an image (not shown) of the aperture patterns in mask 28. The long-axis distribution of light intensity on mask 28 produced by the above described optical elements (normally center-up) can be modified according to the shape and positioning of stop 62. This modification is discussed below, beginning with reference to FIG. 5.

Figure 5:
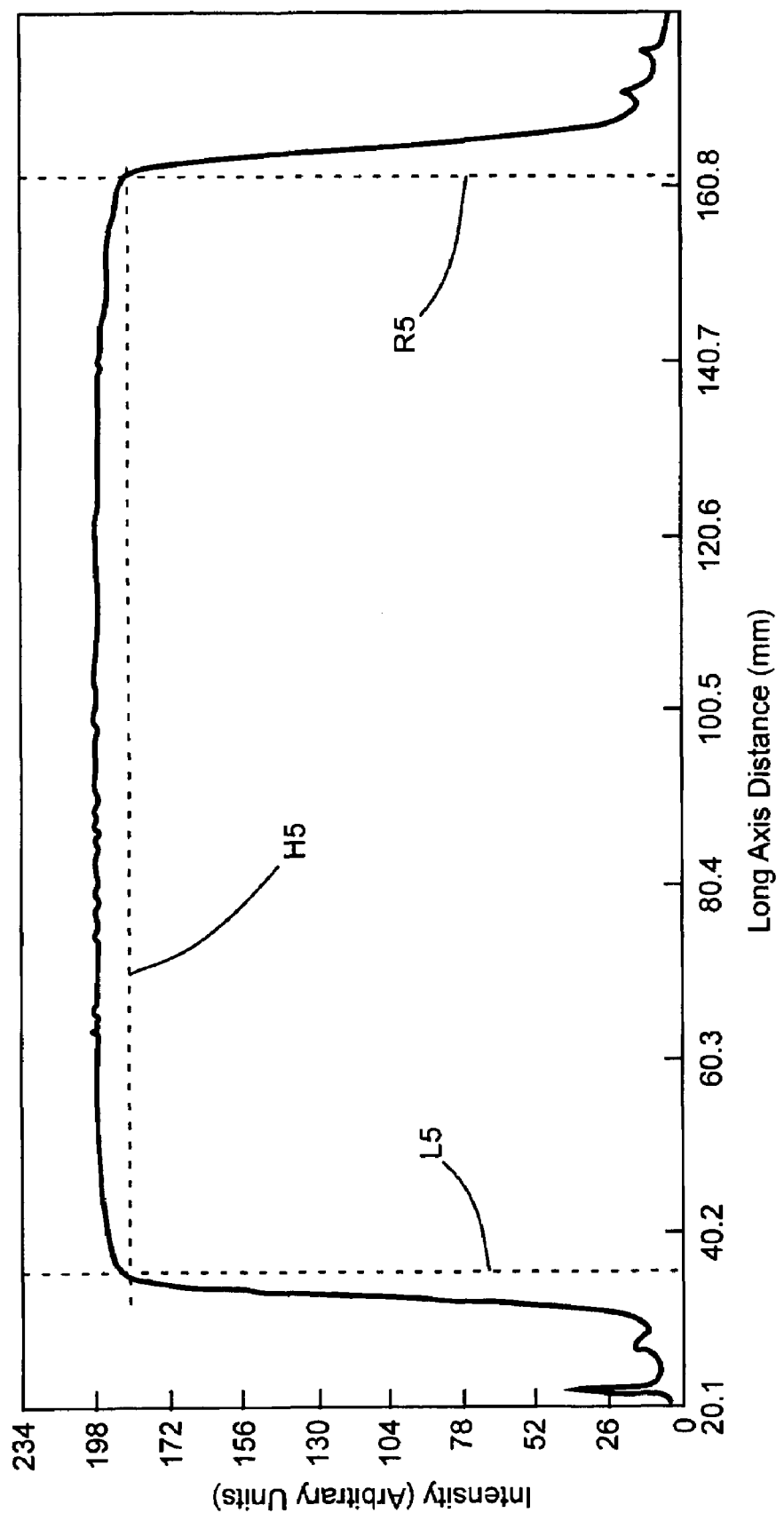
FIG. 5 is a graph schematically illustrating intensity as a function of distance along the long-axis of the beam on the mask in one example of the projection system of FIG. 1 from which the beam stop has been removed from the beam.

FIG. 5 is a graph schematically illustrating intensity as a function of distance along the long-axis of the beam on mask 28 in one example of the optical system 10 of FIG. 1 from which stop 62 has been removed from the beam. Intensity distribution is measured between points designated by dashed lines L5 and R5. It can be seen that between those lines the intensity rises steadily from each line never falling below the lowest value in the measurement range (indicated by horizontal line H5) and reaching a peak value about mid-way between lines L5 and R5. This is the above-described center-up distribution that stop 62 is able to modify. In this measurement, the intensity variation between the lines L5 and R5 is $2\sigma=2.08\%$ (where $\sigma$ is the standard deviation from the mean).

Figure 6:
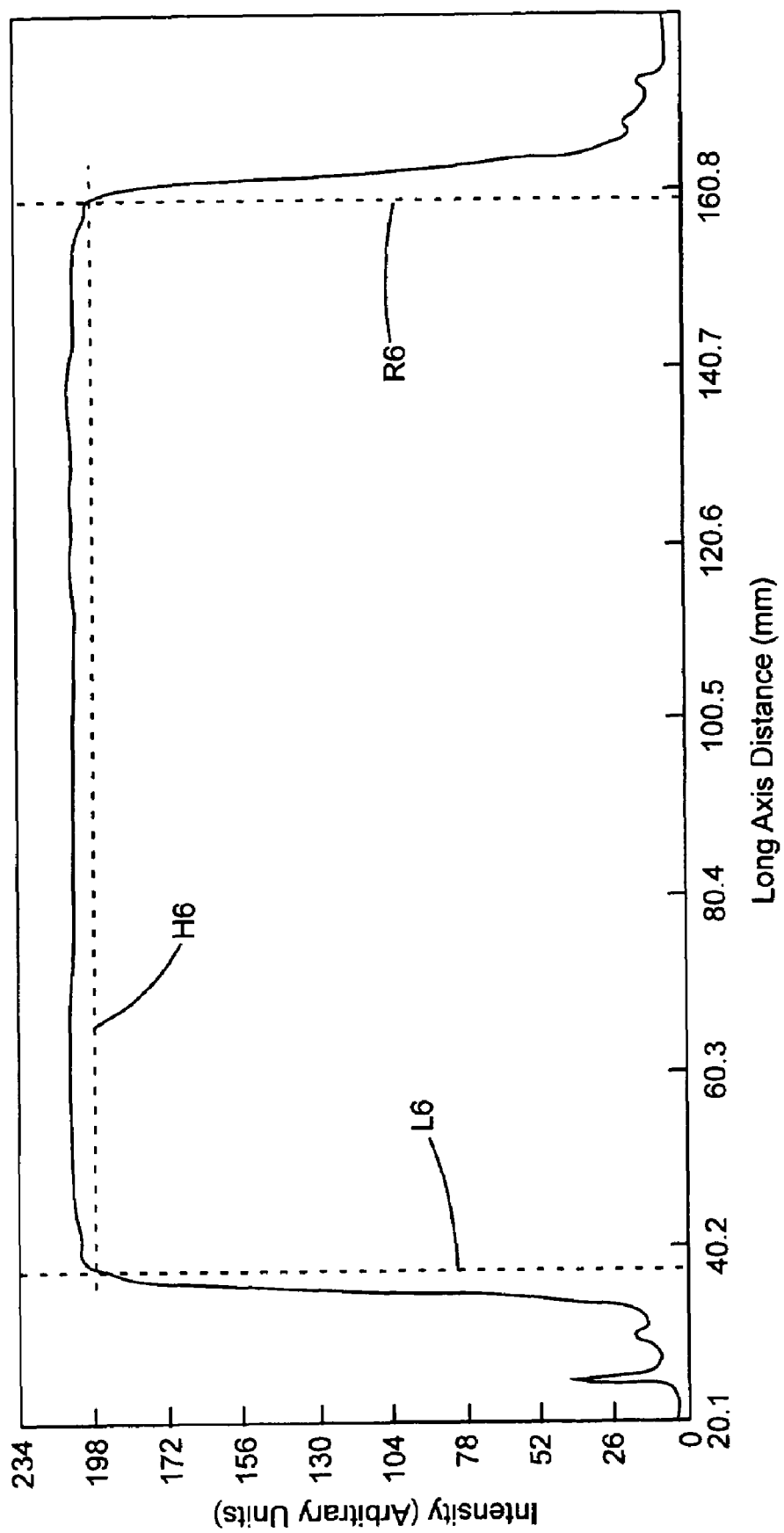
FIG. 6 is a graph schematically illustrating intensity as a function of distance along the long axis of the beam on the mask in another example of the projection system of FIG. 1 in which the beam stop is of the form depicted in FIG. 2, and aligned with the propagation axis of the beam and partially inserted into the beam by an experimentally determined distance along the short-axis direction of the beam.

FIG. 6 is a graph schematically illustrating intensity as a function of distance along the long-axis of the beam on mask 28 in one example of the optical system 10 of FIG. 1 including a stop 62 in accordance with the present invention. In this example, the long-axis beam width (BW) between microlens arrays 58 and 60 is about 100 mm. Stop 62 has a width W of about 15 mm with a rounded tip 62A having a radius of about 7.5 mm. Microlens arrays 58 and 60 are axially spaced apart by about 330 mm, and stop 62 is located about 15 mm from microlens array 60. Short-axis beam width BH at the location of stop 62 is about 25 mm. It is believed that stop 62 extends between about 3 mm and 6 mm into the beam in the short-axis direction into the beam.

It should be noted, in this regard, that the exact extension of the beam was not measured, and in fact, as the edge of the beam can not be precisely defined, an exact extension is equally difficult to define. An optimum extension of the stop was determined by testing various extension depths of the stop and measuring the long-axis intensity distribution of radiation at the mask level.

Intensity distribution is measured between points designated by dashed lines L6 and R6. It can be seen that between those lines the intensity initially rises steadily from each line to a peak value close to each of the lines falling to a lower value, centrally, between the two peaks. The intensity, however, never falls below the lowest (edge) value in the range, indicated by horizontal line H6. In this measurement the intensity variation between the lines L6 and R6 is about 1.36% ($2\sigma$).

Figure 7:
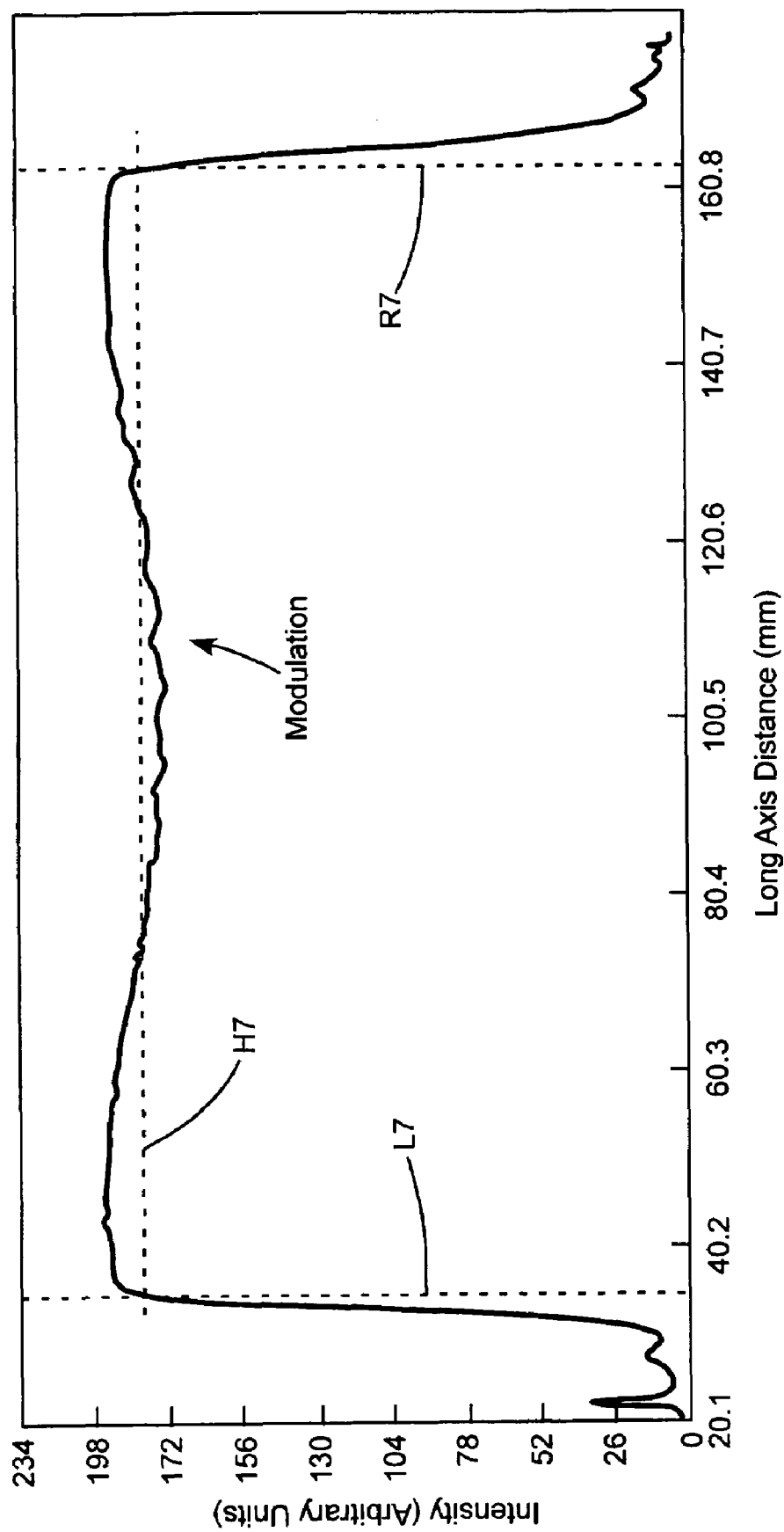
FIG. 7 is a graph schematically illustrating intensity as a function of distance along the long axis of the beam on the mask in yet another example of the projection system of FIG. 1 in which the beam stop is of the form depicted in FIG. 2, and aligned with the propagation axis of the beam and partially inserted into the beam along the short axis direction of the beam beyond the distance of the example of FIG. 6.

FIG. 7 is a graph schematically illustrating intensity as a function of distance along the long-axis of the beam on mask 28 in another example of the optical system 10 of FIG. 1 including a stop 62 in accordance with the present invention. In this example, the dimensions of stop 62, the spacing of the microlens arrays, the beam widths between the microlens arrays and the axial distance position of stop 62 from microlens array 60 are the same as in the example of FIG. 6. In this example, however, stop 62 extends deeper into the beam in the short-axis direction into the beam than in the example of FIG. 6.

Intensity distribution is measured between points designated by dashed lines L7 and R7. It can be seen that between those lines the intensity initially rises steadily from each line to a peak value close to each of the lines falling to a value below the lowest (edge) value in the range, indicated by horizontal line H7. Further, there is significant, relatively high frequency, modulation over about one-half of the long-axis extent of the beam. This modulation has a peak-to-valley excursion comparable to the total intensity variation in the example of FIG. 6. In the graph of FIG. 7, the intensity variation between the lines L7 and R7 is about 7.14% ($2\sigma$).

In other experiments, the effect of placing a stop at other locations was investigated, for example, closer to microlens array 58 than to microlens array 60, and at various positions between microlens arrays 54 and 56. In each case, the effect was to produce modulation comparable to or greater than the modulation exhibited in the example of FIG. 7.

It is believed that a stop having a rounded tip, whether semicircular as in the examples described, or having some non-semicircular curvature such as elliptical, parabolic, or hyperbolic, will provide an intensity distribution having less modulation than would be produced by a tip having an angular form, however, the use of a stop having a tip of an angular form is not precluded. It is also possible that a variation of intensity less than 1.3% may be obtained by arranging two or more stops 62 in the edge of the beam. Some possible arrangements of the stops between microlens arrays 58 and 60 are schematically depicted in FIGS. 8A, 8B, 8C, and 8D.

Figure 8A:
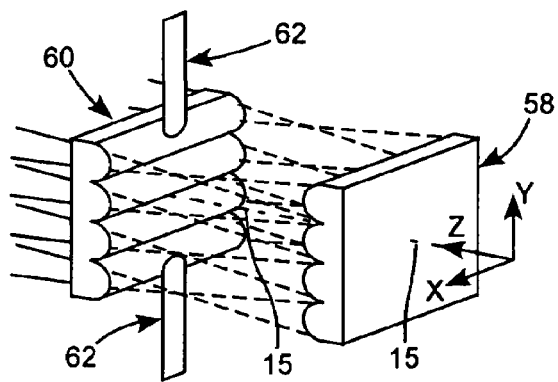
FIGS. 8A-D are three-dimensional views schematically illustrating alternate arrangements of two or more beam stops between the microlens arrays of FIG. 3.
Figure 8B:
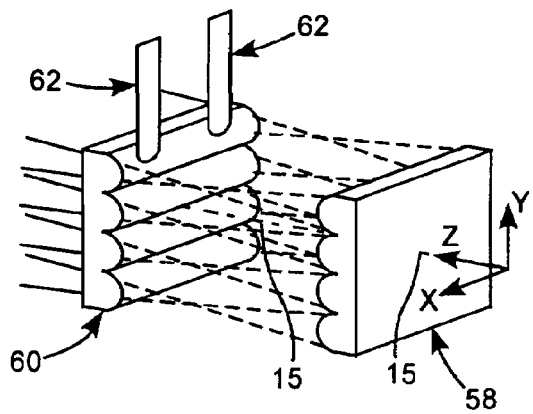
Figure 8C:
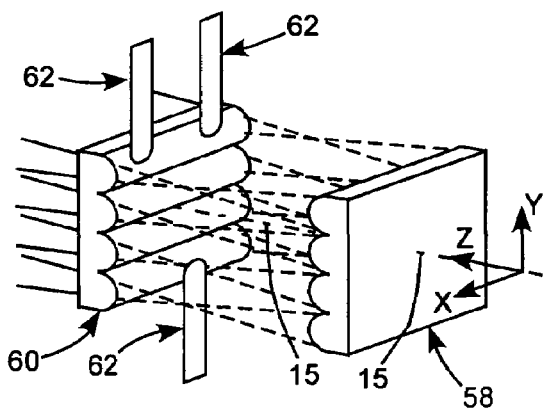
Figure 8D:
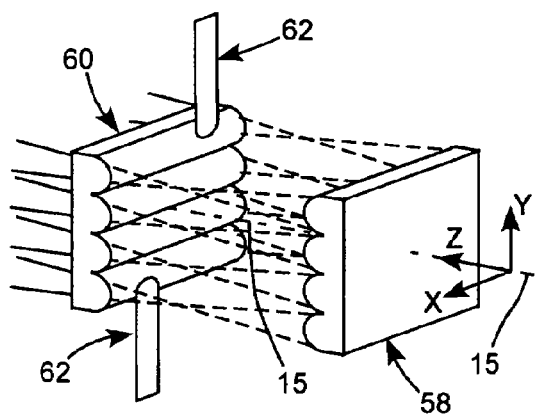

In the arrangement of FIG. 8A there are two stops, one thereof in an upper edge of the beam and the other in the lower edge of the beam. The stops, here, are aligned with each other, and aligned over system axis 15. In the arrangement of FIG. 8B there are also two stops, but each thereof is in the upper edge of the beam, and the stops are aligned with one on either side of the system axis in the long axis direction. In the arrangement of FIG. 8C there are two stops in the upper edge of the beam aligned as in the arrangement of FIG. 8B and one stop in the lower edge of the beam aligned over the system axis as in FIG. 8A. In the arrangement of FIG. 8D, there is one stop in the upper edge of the beam and one stop in the lower edge of the beam. Here, the stops are aligned displaced from the system axis on opposite sides thereof.

Figure 9:
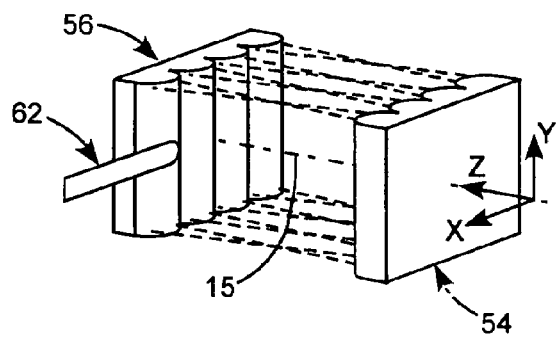
FIG. 9 is a three-dimensional view schematically illustrating an arrangement of a beam stop in accordance with the present invention between microlens arrays of another pair of microlenses of FIG. 1.

It may also be possible to improve short-axis beam uniformity by inserting one or more stops into the beam between microlens arrays 54 and 56 of the long-axis beam homogenizer. An arrangement in which one stop is inserted is depicted in FIG. 9. Here, the stop extends partially into the beam in the long-axis direction. Those skilled in the art will recognize without further illustration or detailed description that multiple stop arrangements are also possible for improving short-axis beam uniformity.

It is emphasized, here, that the multiple stop arrangements described above are merely a sample of possible such arrangements that may provide improved beam uniformity. Whatever the number and alignment of the stops, however, each stop should have a width less than the long-axis beam width at the location of the stops, and should not extend into the beam across the system axis. It is also emphasized that while the present invention is described above in the context of a particular excimer-laser projection system in which the efficacy of the invention has been experimentally determined, the invention is applicable in other laser projection systems having a different arrangement of beam shaping, projection optics, or beam homogenizing optics.

The present invention is described above in terms of a preferred and other embodiments. The invention is not limited, however, to the embodiments described and depicted. Rather, the invention is limited only by the claims appended hereto.

What is claimed is:

1. Apparatus for illuminating a mask with a beam of radiation from a laser, comprising:
   a plurality of optical elements located on a longitudinal axis and arranged to project the laser-radiation beam onto the mask to illuminate the mask, the configuration and arrangement of the optical elements being selected such that the intensity of radiation in the laser-radiation beam on the mask is nearly uniform in a transverse axis of the beam, wherein the plurality of optical elements includes a first plurality of optical elements for projecting the laser-radiation beam onto the mask and at least two arrays of cylindrical microlenses for changing the distribution of radiation in the laser-radiation beam before the laser-radiation beam is projected such that the intensity of light across the mask has the nearly uniform distribution in the transverse axis of the beam, wherein the cylindrical microlenses in each of the arrays are aligned parallel to each other and parallel to the transverse axis; and at least one stop located between the microlenses and extending partially into the laser-radiation beam in a direction perpendicular to the transverse axis for optimizing the uniformity of radiation in the laser-radiation beam on the mask in the transverse axis, said at least one stop having a width less than the width of the beam at the location of the stop.

2. The apparatus of claim 1, wherein said at least one stop partially extends into the laser-radiation beam on one side of the longitudinal axis, and wherein there is at least one other stop, said other stop partially extending into the laser-radiation beam on the other side of the longitudinal axis.

3. The apparatus of claim 1, wherein said at least one stop partially extends into the laser-radiation beam on one side of the longitudinal axis and wherein there is at least one other stop, the one other stop partially extending into the laser-radiation beam on same side of the longitudinal axis to the at least one stop.

4. The apparatus of claim 1, wherein in the nearly uniform distribution of intensity, the intensity rises from a first value at a first edge of the image to a maximum value in about the center of the image then falls to a second value at a second, opposite edge of the image; and wherein the optimized intensity distribution rises from a third value at the first edge of the image to a fourth value between the first edge and the centre of the image, falls to fifth value at the center of the image, rises to a sixth value between the center of the image and the second edge of the image, then falls to a seventh value at the edge of the image.

5. Apparatus for projecting a laser-beam onto a mask to illuminate the mask, comprising:

a first optical arrangement for projecting the laser beam onto the mask;

a second optical arrangement including a plurality of optical elements for changing the distribution of light in the laser-beam before the light is projected such that the intensity of light on the mask is nearly uniform in a transverse axis of the beam, wherein said second optical arrangement includes first and second arrays of cylindrical microlenses, with microlenses in the first array aligned parallel to microlenses in the second array and parallel to the transverse axis of the laser-beam; and at least one stop extending partially into the laser-beam at a selected location in the second optical arrangement for optimizing the uniformity of light on the mask in the transverse axis and wherein the stop has a width less than the transverse-axis width of the laser-beam at the selected location and extends into the beam in a direction perpendicular to the transverse axis.

6. The apparatus of claim 5, wherein the second optical arrangement has a longitudinal axis and wherein there are two stops partially extending into the laser-beam on opposite sides of that longitudinal axis.

7. The apparatus of claim 5, wherein the second optical arrangement has a longitudinal axis, and wherein the stop has a rounded tip, and wherein the rounded tip is oriented toward the longitudinal axis.

8. The apparatus of claim 7, wherein the rounded tip of the stop is one of semi-circular, elliptical, parabolic, or hyperbolic.

9. The apparatus of claim 8, wherein the tip of the stop is semicircular and has a radius equal to one-half of the width of the stop.

10. Apparatus for illuminating a mask with a beam of radiation from a laser, comprising:

a plurality of optical elements located on a longitudinal axis and arranged to project the laser-radiation beam onto the mask to illuminate the mask, the configuration and arrangement of the optical elements being selected such that the intensity of radiation in the laser-radiation beam on the mask is nearly uniform in a transverse axis of the beam; and at least one stop extending partially into the laser-radiation beam at a location between selected ones of the optical elements for optimizing the uniformity of radiation in the laser-radiation beam on the mask in the transverse axis, said at least one stop having a width less than the width of the beam at the location of the stop wherein said at least one stop partially extends into the laser-radiation beam on one side of the longitudinal axis and wherein there is at least one other stop, the one other stop partially extending into the laser-radiation beam on same side of the longitudinal axis to the at least one stop.

11. Apparatus for projecting a laser-beam onto a mask to illuminate the mask, comprising:

a first optical arrangement for projecting the laser beam onto the mask;

a second optical arrangement having a longitudinal axis and including a plurality of optical elements for changing the distribution of light in the laser-beam before the light is projected such that the intensity of light on the mask is nearly uniform in a transverse axis of the beam;

and at least one stop extending partially into the laser-beam at a selected location in the second optical arrangement in a direction perpendicular to the transverse axis for optimizing the uniformity of light on the mask in the transverse axis and wherein the stop has a width less than the transverse-axis width of the laser-beam at the selected location and has a rounded tip, and wherein the rounded tip is oriented toward the longitudinal axis.

12. The apparatus of claim 11, wherein the rounded tip of the stop is one of semi-circular, elliptical, parabolic, or hyperbolic.

13. The apparatus of claim 12, wherein the tip of the stop is semicircular and has a radius equal to one-half of the width of the stop.

14. Apparatus for projecting a laser-beam onto a mask to illuminate the mask, comprising:

a first optical arrangement for projecting the laser beam onto the mask;

a second optical arrangement including a plurality of optical elements for changing the distribution of light in the laser-beam before the light is projected such that the intensity of light on the mask is nearly uniform in a transverse axis of the beam; and at least one stop extending partially into the laser-beam at a selected location in the second optical arrangement for optimizing the uniformity of light on the mask in the transverse axis wherein said stop extends into the laser beam from a side edge thereof in a direction perpendicular to the transverse axis of the beam an amount less than 35% of the lateral extent of the beam in the direction perpendicular to the transverse axis and wherein the width of the stop in the transverse axis of the beam is less than 50% of the lateral extent of the beam in the transverse axis.

15. An apparatus as recited in claim 14, wherein said plurality of optical elements include arrays of cylindrical microlenses.

16. An apparatus as recited in claim 14, wherein said beam stop includes a rounded tip oriented facing the beam.

* * * * *